July 7, 1942.  R. A. CARROLL  2,289,100
RADIATOR SHIELD
Filed March 11, 1941
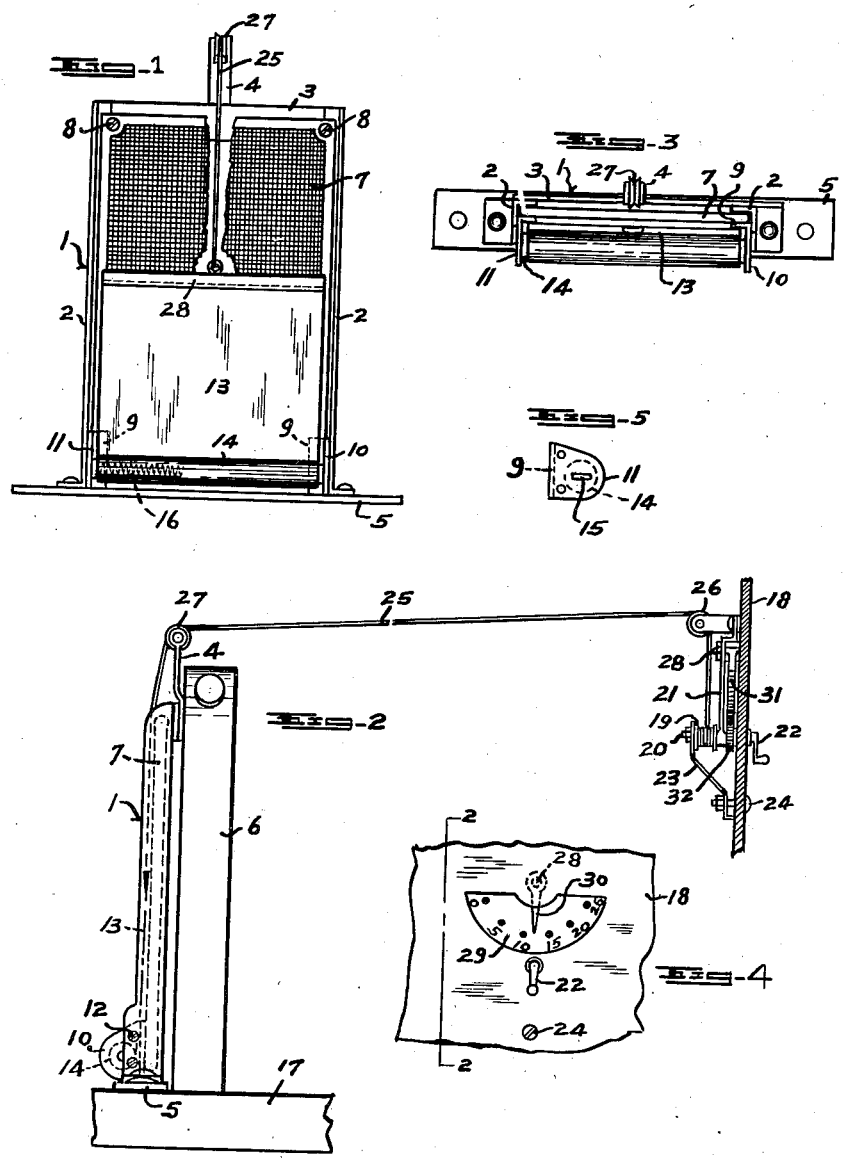
Inventor
Robert A. Carroll
By Jack Snyder
Attorney Patented July 7, 1942

2,289,100

UNITED STATES PATENT OFFICE 2,289,100

RADIATOR SHIELD

Robert A. Carroll, West Finley, Pa.

Application March 11, 1941, Serial No. 382,725

1 Claim. (Cl. 257—132)

My invention relates to a shield for the radiator of an internal combustion engine, and contemplates among its important objects and advantages to provide a shield of the character described, which combines a construction embodying a regulator for controlling the cooling efficiency of the radiator in accordance with temperature conditions and a backing element from the regulator permitting the free passage of air therethrough but preventing the entrance of insects and other foreign matter into the radiator, which may be adjusted by the operator from the driver's seat, which embodies an operating mechanism for the regulator including a dial indicating the position or adjustment of the regulator and visible to the operator from his seat in the vehicle, which may be readily installed in a motor vehicle already constructed as well as form a permanent component part of a new vehicle structure, which is simple in its construction and arrangement, durable and highly efficient in its use, compact, and comparatively economical in its manufacture, installation, operation and maintenance.

To the accomplishment of these and such other objects as may hereinafter appear, the invention resides in the novel construction, combination and arrangement of parts herein specifically described and illustrated in the accompanying drawing, but it is to be understood that the latter is merely an embodiment of the invention, and that changes in the form proportions and details of construction may be resorted to that come within the scope of the claim hereunto appended.

Figure 1 is a front elevational view of a radiator shield constructed in accordance with the invention.

Figure 2 is a side elevational view thereof and illustrating its adaptation to a motor vehicle structure, together with the embodied operating mechanism mounted on the instrument board, the latter being in cross section taken on line 2—2, Figure 4.

Figure 3 is a top plan view of the radiator shield.

Figure 4 is a fragmentary front view of the instrument board provided with dial and indicator appliances embodied in the present invention.

Figure 5 is a side view of one of the bearings supporting the curtain roller.

Referring in detail to the drawing 1 denotes the entire frame comprising a pair of vertical side members 2 preferably constructed of angle iron, a horizontal top member 3 carrying a fixed centrally disposed and vertically projecting arm 4, and a horizontal base member 5. All parts of the frame are permanently secured together to form a rigid structure. The frame is generally rectangularly-shaped and is of a size conforming to the height and width of the radiator 6 in connection with which the shield is to be used.

The side walls of the angle iron side members 2 are disposed outwardly and extend forward. A screen 7, consisting of a sheet of suitable mesh wire surrounded by a rigid screen frame, is removably mounted in the frame 1. The screen rests against the back walls of the frame side members 2 between the side walls of the latter. The upper end of the screen is secured by screws 8, and the lower end thereof is engaged between the back walls of the vertical side members 2 and the inturned flanges 9 of a pair of bearings, respectively indicated at 10 and 11, which latter are removably secured by screws 12 to the side walls of respective side members 2. The allowed removal of the screen 7 from the frame 1 will facilitate the cleaning or replacement thereof without disturbing any other parts of the installed shield. One purpose of the screen 7 is to prevent the entrance of foreign matter into the radiator 6 during the travel of the vehicle, and another purpose is the use of the screen as a backing element for a curtain 13 employed and operable for regulating the cooling area of the radiator in the manner to be described.

The curtain 13 may be constructed of any suitable, flexible sheet material, and is wound on a roller 14. The latter is disposed horizontally at the lower end of the frame 1, and is supported by a pair of trunnions, which are engaged in respective bearings 10 and 11. One of the trunnions is freely revoluble in the bearing 10, and the other trunnion 15 is flattened and held against rotation in its engagement in its bearing 11. The trunnion 15 is attached to a spiral spring 16 within the roller 14 in the same manner as an ordinary window shade roller, so that the curtain 13 unwinds from the roller under tension, and when released will automatically wind up upon the curtain roller. To remove the latter from the frame 1, it is only necessary to remove the screws 12 which secure the bearing 11 to the side member 2 of the frame 1.

As clearly illustrated in Figure 2, the improved shield device is positioned vertically forward of and in close proximity to the radiator 6 of a motor vehicle engine. The frame 1, carrying the screen 7 and curtain 13, is rigidly secured to the motor vehicle frame 17, or to any other suitable part of the motor vehicle chassis in any suitable manner. The shield device need not be particularly ornamental, as it is not visible, being enclosed by the engine hood grill of the type now in common use.

The adjustment of the curtain 13 in the frame 1 is controlled by an operating mechanism mounted on the inner side of the instrument board 18 of the motor vehicle. The operating mechanism includes a drum 19 fixed on a shaft 20 supported at the inner side of the instrument board by a bearing bracket 21, and an operating handle 22 secured to the shaft 20 and disposed on the outer side of the instrument board within convenient reach from the driver's seat. The inner end of the shaft 20 projects through a resilient supporting bracket 23 and frictionally engages the inner end of the drum 19.

The lower end of the supporting bracket 23 abuts against in the inner face of the instrument board and is engaged by an adjusting screw 24 mounted in the latter within reach of the driver's seat. The adjustment of the screw 24 determines the required frictional retardation applied to the operating mechanism for the purpose to be described.

An operating cable 25 passes over a sheave 26 supported at the inner side of the instrument board 18 above the operating mechanism, and over a sheave 27 carried at the upper end of the vertically projecting arm 4 carried by the frame 1. One end of the cable 25 is secured to and winds on the drum 19, and the other end thereof is joined with the reenforced free end 28 of the curtain 13.

When the operating handle 22 is turned in the clockwise direction the operating mechanism will be operated to shift or pull the curtain 13 upwardly to the closing position in front of the screen 7, and when the operating handle is turned in the opposite or counter-clockwise direction, the mechanism will function to release the cable 25 and thereby allow the curtain 13 to be automatically rewound on the curtain roller 14 while being shifted to the open position. Due to the automatic function of the spring actuated roller 14, the cable 25 and any unwound portion of the curtain 13 will be suitably held in taut condition at all times regardless of the relative position of the curtain in the frame 1. The proper adjustment of the screw 24 will cause the frictional retardation to prevent the free movement of the operation mechanism whereby the curtain 13 is held against movement at any adjusted position in the frame 1.

The operating mechanism further includes a dial 29 mounted on the instrument board 18 and visible from the driver's seat. The dial 29 displays numerical designations denoting inches, and is associated with an indicator finger 30 for indicating the adjusted position of the curtain 13 in the frame 1 and the radiator area covered or shielded by such adjusted position.

The indicator finger 30 is fixed to a shaft 28, which is revolubly supported in the bearing bracket 21. A segment gear 31 is also fixed on the shaft 28 and meshes with a pinion 32 fixed on the drum shaft 20. The gear ratios of the pinion 32 and segment gear 31 is such that the proper indicating movement of the indicating finger is imparted to the latter when the mechanism is operated to adjust the curtain 13 in the frame 1. The position of the bearing bracket 21 limits the movement of the segment gear 31 in either direction, and thereby arrests the operation of the operating mechanism when extreme adjustment of the curtain 13 have been effected.

The important features of the invention reside in the novel manner in which the screen 7 is removably secured in the frame 1, and the embodiment of the dial elements for visibly indicating the adjustment of the curtain 13 in the frame 1. The curtain, when unwound from the curtain roller 14, is positioned flatly against the front face of the screen. The curtain may be constructed of comparatively inexpensive material that is relatively light in weight. The curtain is not subjected to undue severe usage, and the construction, arrangement and operation of the device do not cause the curtain to be forcibly sucked against the air passages of the conventional type of radiator structure.

The present invention combines a winter front, air filter and screen for an engine radiator, and provides a most economical and efficient device of its kind, which may be conveniently employed and successfully operated in the manner and for the purpose herein set forth.

What I claim is:

In a shield for the radiator of a motor vehicle, the combination of a frame secured to the vehicle forwardly of and in proximity to the radiator, a screen removably mounted in said frame, a pair of bearing members removably secured at the lower end of said frame, an inturned flange carried by and formed integral with each of said bearing members for engaging the lower end of said screen to hold said lower end of the latter in position in said frame, a roller supported in said bearing members, and a curtain having one end secured to said roller, said roller being spring actuated for normally winding said curtain thereon.

ROBERT A. CARROLL.